United States Patent [19]

Chang et al.

[11] 3,979,219
[45] Sept. 7, 1976

[54] WOOD FINISH REMOVER

[75] Inventors: Edward H. Chang, Burnsville; William V. Block, Minneapolis; Mark L. Gruss, Excelsior, all of Minn.

[73] Assignee: Fremont Industries, Inc., Shakopee, Minn.

[22] Filed: Mar. 6, 1975

[21] Appl. No.: 555,862

[52] U.S. Cl. ............................. 106/271; 134/38; 257/144; 257/171
[51] Int. Cl.$^2$ ...................... B08B 3/04; C08L 91/06
[58] Field of Search ............ 106/271; 252/144, 171; 134/38

[56] References Cited
UNITED STATES PATENTS

| | | | |
|---|---|---|---|
| 3,330,769 | 7/1967 | Golben | 252/143 |
| 3,538,007 | 11/1970 | Cooper | 252/144 |
| 3,887,481 | 6/1975 | Korpics | 252/171 |

*Primary Examiner*—Theodore Morris
*Attorney, Agent, or Firm*—Orrin M. Haugen

[57] ABSTRACT

An acidic wood finish remover formulation which consists essentially of a mixture of hydroxyacetic acid in methylene chloride solution. A vapor pressure depressant is present, such as paraffin and a solubilizer for the wax, such as toluene is present. An anionic detergent consisting essentially of linear alkyl benzene sulfonic acid is utilized as well as a corrosion inhibiter for permitting retention of the material in metal storage vessels.

3 Claims, No Drawings

WOOD FINISH REMOVER

CROSS-REFERENCE TO RELATED APPLICATION

The present invention is an improvement over that formulation described and claimed in co-pending application Ser. No. 510,294, filed Sept. 30, 1974, entitled "ACIDIC WOOD FINISH REMOVER", Edward H. Chang, and assigned to the same assignee as the present invention.

BACKGROUND OF THE INVENTION

The present invention relates generally to a wood finish remover, and more specifically to an acidic finish remover primarily adapted for use in contact with delicate wood articles, such as antique articles or the like. The formulation of the present invention has been found effective in removal of a wide variety of finishes normally applied to wood, including paint, varnish, lacquer, stains and the like, and has further been found to be effective in removal of typical fillers, such as putty and the like. The formulation maintains whiteness of the wood surface, and accordingly does not stain or darken the surface such as frequently occurs when alkaline or neutral finish removers are applied to old wood surfaces.

In the treatment of delicate wood articles, particularly antiques, the character of the wood is frequently such that use of conventional finish removers is undesirable or impossible, inasmuch as conventional finish removers tend to open or raise the grain of the wood to an unusual extent, and thereby tend to render subsequent restoration of the article difficult. Finish removers have traditionally been aqueous solutions of neutral or relatively high pH and consisting of sodium hydroxide or trisodium phosphate in water, operated at a temperature from room temperature to 140° F. Another commonly employed solution was a cold solvent remover consisting of methylene chloride, methanol and potassium hydroxide. Each of these solutions frequently resulted in substantial darkening of the wood surface, as well as deterioration of the wood caused by the alkaline or high pH levels of the formulation. Subsequent to use, it was frequently necessary to brighten the darkened wood surfaces by utilizing acidic chemicals such as organic acids including oxalic acids, mineral acids including hydrochloric or sulfuric acids or the like. However, following the lightening process, the wood was not restored properly due to the presence of excessively raised wood grains. If veneers were utilized, these veneers or the adhesive film frequently swelled differentially relative to the substrate or base. Glued joints were frequently attacked and became loosened, particularly in the presence of high pH solutions or alkaline chemicals. The formulation of the present invention is one which effectively removes finishes from wood surfaces, particularly aged wood finishes, without requiring dual operations, and furthermore without rendering it necessary to subsequently heavily sand or otherwise treat the article to any excessive degree. Therefore, antique wood articles prepared from a rather smooth, close-grained material such as maple or mahogany may be treated without rendering it essential to subsequently heavily treat the surface with sandpaper, steel wool, or other rubbing compositions prior to the application of a new finish coating. The formulation of the present invention is also adapted for use with modern organic coatings and with new or relatively new wood surfaces.

Because of the relatively mild acidic character of the formulation, that is, for example at a pH level of between about 2 and 4, it is possible for the users to handle the material without requiring unusual skin protection. Also, because of the employment of effective vapor pressure depressants such as paraffin, evaporative losses and the resulting odors of the formulation are minimized. The formulation makes available a single-phase mixture, without stratification or separation of the components, with the material having excellent water rinsability.

SUMMARY OF THE INVENTION

Briefly, the formulation of the present invention employs methylene chloride as the active solvent for the formulation, and for softening and otherwise attacking the finish to be removed. Paraffin wax is employed, as indicated, as a vapor pressure depressant for the purpose of retarding the rate of evaporation of methylene chloride from the solution. Toluene is preferably incorporated in the solution for the purpose of rendering the paraffin wax soluble, and also for the purpose of providing a solubilizer for stains. The formulation further includes methyl alcohol as a co-solvent for methylene chloride, and for the purpose of penetrating wood finishes. The formulation further includes quantities of linear alkyl benzenesulfonic acid, a triazole such as benzotriazole or tolyltriazole along with water. For solutions to be applied by brush, a thickener such as methylcellulose may be employed.

Therefore, it is the primary object of the present invention to provide an improved wood finish remover, and in particular, an acidic finish remover based upon hydroxyacetic acid in solution with methylene chloride.

It is yet a further object of the present invention to provide an improved wood finish remover which is based upon a solution of hydroxyacetic acid in methylene chloride, and which contains an anionic detergent selected from the group consisting of linear alkyl benzenesulfonic acids.

It is yet a further object of the present invention to provide an improved wood finish remover formulation which is desirable for utilization in connection with delicate wooden articles, and wherein the remover, in treating the wood surface, does not affect the wood surface so as to result in darkening or excessive grain raising.

Other and further objects of the present invention will become apparent to those skilled in the art upon a study of the following specification and appended claims.

DESCRIPTION OF THE PREFERRED EMBODIMENT

In order to prepare the composition of the present invention, the following formulation was prepared:

Table I

| Component | Percent by Weight |
|---|---|
| Methylene chloride | 71 |
| Toluene | 4.5 |
| Paraffix wax (consisting essentially of $C_{36}H_{74}$, m.p. 127–134° F.) | 1 |
| Methanol | 10 |
| Acidic constituent consisting of 70% aqueous solution of hydroxyacetic acid | 5 |
| Linear alkyl benzenesulfonic acid | |

Table I-continued

| Component | Percent by Weight |
| --- | --- |
| (having 12 carbon atoms in alkyl chain) | 6 |
| Benzotriazole | 0.5 |
| Water | 2 |

The acid constituent is, as indicated, an aqueous solution of hydroxyacetic acid, with such materials being commercially available.

This solution is one which may be utilized directly as a remover for finishes from wood surfaces. It is not necessary to treat the surfaces subsequent to exposure to this composition such as for the purpose of bleaching or the like. The material has been found to attack the finishes at an extremely rapid rate, and hence the effectiveness of the material may be appreciated with only a single-phase operation being required.

An alternate composition may be prepared utilizing the following formulation:

Table II

| Component | Percent by Weight |
| --- | --- |
| Methylene chloride | 66 |
| Toluene | 4.5 |
| Paraffin wax (consisting essentially of $C_{36}H_{74}$, m.p. 127–134° F.) | 1 |
| Methanol | 15 |
| Acidic constituent consisting of 70% aqueous solution of hydroxyacetic acid | 5 |
| Linear alkyl benzenesulfonic acid (having 12 carbon atoms in alkyl chain) | 3 |
| Tolyltriazole | 0.5 |
| Water | 2 |
| Methylcellulose | 3 |

The composition as set forth in this Table II is particularly adapted for use with hand operations wherein the composition has sufficient viscosity to permit its being brushed on. The purpose of the methylcellulose constituent is to increase the viscosity and thicken the material so as to permit its application in this fashion. The effectiveness is, of course, essentially the same as that of the composition set forth in Table I.

The appropriate workable ranges for the individual components in the formulation is set forth in Table III hereinbelow:

Table III

| Component | Percent by Weight |
| --- | --- |
| Acid component (hydroxyacetic acid — 70% aqueous solution) | 1.5 – 15 (about 1% to 11% acid component) |
| Paraffin | 0.5 – 2 |
| Toluene | 3 – 10 |
| Methanol | 5 – 20 |
| Linear alkyl benzenesulfonic acid (Dodecyl benzenesulfonic acid) | 3 – 15 |
| Methylene chloride | balance |

Formulations within the range set forth above may be utilized appropriately for removal of finishes from wood surfaces, and particularly for the removal of such finishes from antiques or other wood structures.

As will be apparent, a corrosion inhibiter such as benzotriazole or tolyltriazole is normally incorporated for permitting utilization of this formulation in metallic vessels, such as cans, drums, or tanks. Either benzotriazole or tolyltriazole may be employed as the corrosion inhibiter, and it will be appreciated, of course, that other similar components could be utilized for this purpose, if desired. These triazole components, however, have been found to be particularly compatible with the overall formulation and hence are preferred for this purpose.

In order to define the features of the invention, the following discussion on the features of the components is provided.

THE ACID COMPONENT

As has been set forth, the acid employed is an aqueous solution of hydroxyacetic acid. Hydroxyacetic acid is commercially available in technical grades, and as such, may be employed in an appropriate fashion.

The utilization of hydroxyacetic acid has been found desirable from a number of standpoints. The odor of the formulation is generally mild, and acceptable for users. The utilization of the corrosion inhibiters in combination with the hydroxyacetic acid renders the solution rather passive on the materials normally employed in dip tanks containing stripper materials. Specifically, ordinary steel, galvanized or otherwise inexpensive materials of construction are employed in the tanks, and as such, the materials are not attacked at any significant rate, thereby preserving the overall color of the stripper. In those instances wherein the materials of construction in the tank are attacked, the darkening frequently occurs due to an increase in the iron content, which, in turn, may impregnate the wood being treated.

In certain situations, phosphoric acid or other phosphates may be employed to passivate the material, and also to provide a colorless or white precipitate when iron phosphate occurs in the solution. Either secondary or tertiary phosphate may form whenever corrosion occurs in iron vessels. So long as the iron phosphate content remains low, however, there will be little, if any, deposit of the material on the surface of the wood. Any deposit will normally be either white or gray in color and as such may not always be undesirable.

The utilization of hydroxyacetic acid as the acidic accelerator is desirable from the standpoint of permitting use of the material at low temperatures, such as room temperature. Accordingly, it is not necessary to utilize the formulations as a hot tank strip formulation, in which application, a substantial quantity of methylene chloride may be constantly evaporated from the material. The utilization of paraffin to reduce the vapor pressure and to preserve the methylene chloride does assist in this regard, however as the temperature of use increases, the loss of methylene chloride likewise increases and the present formulation is well adapted for use at room temperature levels.

VAPOR PRESSURE DEPRESSANT

The combination of toluene and paraffin is provided in order to reduce the evaporative losses of methylene chloride in the working solutions. The paraffin wax employed has a melting point of between about 127°–134° F. (47°–65° C.) and consists essentially of a saturated hydrocarbon with the formulation $C_{36}H_{74}$. Also, the ranges of toluene and paraffin in the formulation have been set forth hereinabove, and it has been found helpful that the combined paraffin and toluene levels in a working solution be maintained between about 3.5% and 12%.

In actual operation, the toluene acts as an initial solvent for the paraffin, thus increasing the speed at which the paraffin will enter the solution. Therefore, the paraffin is normally pre-dissolved in the toluene, with the combination thereafter being employed as a component to reduce the evaporative losses of methylene chloride.

METHANOL

Methanol is incorporated in the solution to assist in the stripping action and also to provide for a hydrophilic component. The quantity of methanol in the solution is not particularly critical, and may be held anywhere between the ranges of about 5% to about 20%.

LINEAR ALKYL BENZENESULFONIC ACID

The sulfonic acid employed is preferably dodecyl sulfonic acid, it being understood, however, that an equivalent amount of either linear alkyl benzenesulfonic acid having a carbon chain length of from 10 to 13 carbon atoms may be employed. These materials may be substituted on a 1:1 basis in the formulation set forth in Tables I, II and III hereinabove.

The presence of linear alkyl benzenesulfonic acid has been found to promote rinsability of the material. In use, the surface being treated may remain oily upon drying of the materials, particularly when linear alkyl benzenesulfonic acid is not employed. However, with this material present in the formulation, a synergistic effect appears to exist between this component and the acidic component, thus enhancing the attack on the pigmentation of the paint film being attacked.

METHYLENE CHLORIDE

The methylene chloride functions as a principal solvent for the organic coating, and is also the principal component in the present formulation. The presence of methanol appears to enhance the solvent capability of methylene chloride, thus achieving a synergistic effect or action between these two components.

CORROSION INHIBITER

In the event the materials are to be retained in a metallic container or vessel, such as a steel tank or the like, corrosion inhibiters are added to the formulation. Those found most suited for the present formulation are benzotriazole or tolyltriazole. In some applications, phosphoric acid or 1,3-diethylthiourea may be utilized as well. Benzotriazole or tolyltriazole are preferably employed in combination in the overall formulation. These materials have been found to passivate iron surfaces, and are conveniently employed without adversely affecting the stripping qualities of the formulation.

In the present formulations, benzotriazole or tolyltriazole are each preferably present in the composition in an amount ranging from between about 0.25% and 2% by weight. As has been indicated, these materials are generally interchangeable, one with the other, in these compositions.

We claim:
1. A film stripping composition for cohesive finish films consisting essentially of from 1% to 11% by weight of hydroxyacetic acid, 3.5% to 11% by weight of a vapor pressure depressant consisting of a mixture of paraffin and toluene; from 5% to 20% by weight of methanol, and from 3% to 15% by weight of an anionic detergent selected from the group consisting of linear alkyl benzenesulfonic acid with an alkyl chain length of from 10 to 13 carbon atoms; from about 0.5% to about 5% water; balance methylene chloride.

2. The composition as set forth in claim 1 being particularly characterized in that a triazole corrosion inhibiter is present in an amount ranging from 0.5% to 2% by weight, said triazole corrosion inhibitor being selected from the group consisting of benzotriazole and tolyltriazole.

3. The composition as set forth in claim 2 being particularly characterized in that the formulation comprises a mixture of components as follows:

| Component | Percent by Weight |
| --- | --- |
| Methylene chloride | 71 |
| Toluene | 4.5 |
| Paraffin wax (consisting essentially of $C_{36}H_{74}$, m.p. 127–134°F.) | 1 |
| Methanol | 10 |
| Acidic constituent consisting of an aqueous solution of 70% hydroxyacetic acid | 5 |
| Linear alkyl benzenesulfonic acid | 6 |
| A triazole selected from the group consisting of benzotriazole and tolyltriazole | 0.5 |
| Water | 2. |

* * * * *